(No Model.)

T. JOHNSON & W. BRANDON.
BROILER.

No. 366,960. Patented July 19, 1887.

Attest:
H. S. Knight
Edward Oliver

Inventor:
Thos Johnson
Wm Brandon
By Knight Bros
Attys

UNITED STATES PATENT OFFICE.

THOMAS JOHNSON AND WILLIAM BRANDON, OF ST. LOUIS, MISSOURI.

BROILER.

SPECIFICATION forming part of Letters Patent No. 366,960, dated July 19, 1887.

Application filed November 2, 1886. Serial No. 217,827. (No model.)

*To all whom it may concern:*

Be it known that we, THOMAS JOHNSON and WILLIAM BRANDON, both of the city of St. Louis, in the State of Missouri, have invented a certain new and useful Improvement in Broilers, of which the following is a full, clear, and exact description, reference being had to the accompanying drawings, forming part of this specification, and in which—

Figure 1:
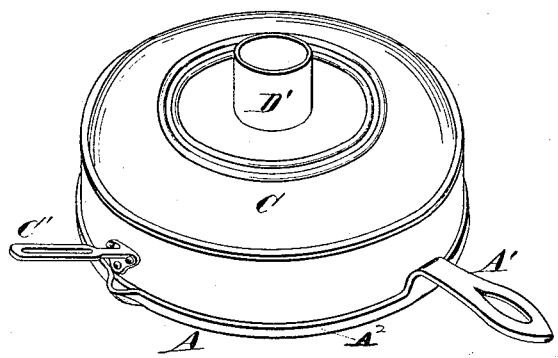
Figure 2:
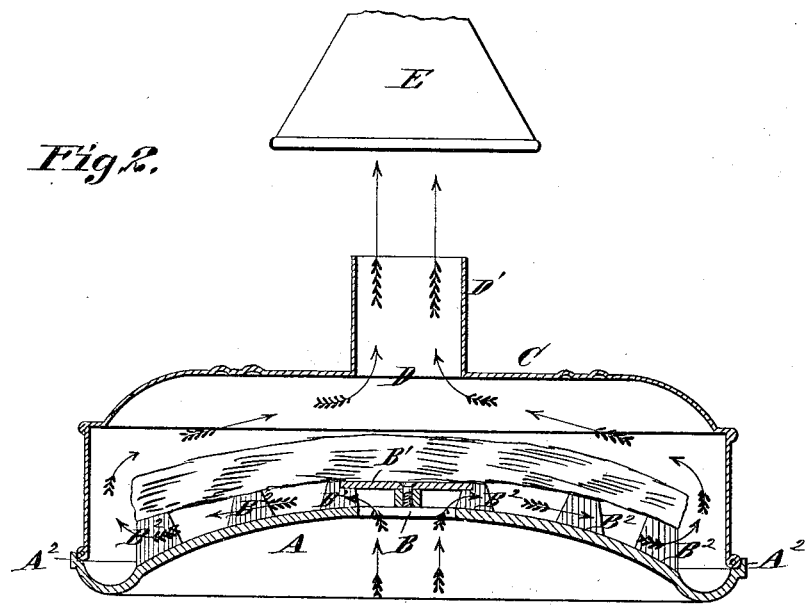

Figure 1 is a perspective view of our improved broiler. Fig. 2 is a vertical section showing a funnel located over the broiler.

Our invention is a device for broiling steaks; and it consists in features of novelty hereinafter fully described, and pointed out in the claims.

Referring to the drawings, A represents the body of the broiler, which is constructed to fit over the burner of a gasoline-stove, or to fit in the pot-hole of an ordinary stove or range, and which is provided with a central opening, B, in its bottom, a cap, B', over the opening, and a number of projections, B², on its inner face. The steak to be broiled is placed upon or over the cap and projections, and the heat circulates beneath it, as shown by the arrows in Fig. 2.

The body A is provided with a handle, A'. C represents a cover provided with a handle, C', and which is placed over the body and rests upon a marginal flange, A², of the body, as shown. The cover is provided with a central opening, D, from which extends a neck or tube, D', and the heat passes from the outer edge or periphery of the body over the steak, as indicated by the arrow, and escapes through the opening D and neck D', and in this manner is made to circulate entirely around the steak.

There may be a funnel, E, located over the tube or neck D', for the purpose of collecting the fumes as they issue from the neck and conveying them off through a pipe, upon which the funnel is secured. The pipe may be extended to any suitable point or place.

We claim as our invention—

1. In combination with the body constructed with a central opening, projections for supporting the article to be cooked above the bottom of the body, leaving an air-space thereunder, and the cover provided with a central opening, all combined and arranged so that a circulation of heated air is caused to pass under, at the sides, and over the top of the article being cooked, substantially as and for the purpose set forth.

2. In combination with the body constructed with a central opening, cap over the opening in its bottom, and projections on its upper face, the cover arranged to fit closely on the body and provided with a central opening, substantially as set forth.

THOS. JOHNSON.
WILLIAM BRANDON.

In presence of—
BENJN. A. KNIGHT,
JOSEPH WAHLE.